United States Patent [19]

Bonnerot et al.

[11] Patent Number: 4,777,653

[45] Date of Patent: Oct. 11, 1988

[54] APPARATUS FOR CONTROLLING TRANSMISSION POWER OVER A DIGITAL RADIO COMMUNICATION CHANNEL

[75] Inventors: Georges Bonnerot, Les Ullis; Christophe Lerouge, Paris, both of France

[73] Assignee: Telecommunications Radioelectriques et Telephoniques T.R.T., Paris, France

[21] Appl. No.: 940,325

[22] Filed: Dec. 11, 1986

[30] Foreign Application Priority Data

Dec. 20, 1985 [FR] France ................................ 85 18919

[51] Int. Cl.⁴ .............................................. H04B 1/38
[52] U.S. Cl. ........................................ 455/69; 455/10; 455/52; 455/73
[58] Field of Search ................ 455/69, 67, 10, 52, 455/115, 73, 50, 63, 65, 68, 70, 88; 375/76, 58; 371/48, 49

[56] References Cited

U.S. PATENT DOCUMENTS

| | | | |
|---|---|---|---|
| 4,495,648 | 1/1985 | Giger | 455/69 |
| 4,619,002 | 10/1986 | Thro | 455/52 |
| 4,639,936 | 1/1987 | Hogan et al. | 375/76 |
| 4,716,573 | 12/1987 | Bergström et al. | 455/69 |
| 4,723,303 | 2/1988 | Koch | 455/67 |

FOREIGN PATENT DOCUMENTS

| | | | |
|---|---|---|---|
| 0122246 | 9/1981 | Japan | 455/69 |
| 0013429 | 1/1984 | Japan | 455/69 |

Primary Examiner—Robert L. Griffin
Assistant Examiner—Curtis Kuntz
Attorney, Agent, or Firm—Thomas A. Briody; Leroy Eason

[57] ABSTRACT

Apparatus for controlling the transmission power of a transmitting station over a digital radio communication channel, based on information relating to the level of the signal received at a receiving station and information relating to the quality of such received signal relative to a predetermined error rate. The signal level information and signal quality information is derived by respective threshold measurement devices in the receiving station, and is transmitted back to the transmitting station over a return channel. The transmitting station comprises means for effecting combined processing of such information to derive a control signal which controls means for increasing or decreasing the transmitting power over a dynamic adjustment range. In a first part of such dynamic range such control is based only on the information relating to received signal level, and over a second part of such range such control is additionally based on the quality of the received signal.

5 Claims, 2 Drawing Sheets

APPARATUS FOR CONTROLLING TRANSMISSION POWER OVER A DIGITAL RADIO COMMUNICATION CHANNEL

BACKGROUND OF THE INVENTION

1. Field of the Invention

The present invention relates to apparatus for controlling the transmitting power over a digital radio channel between at least one transmitting station and one receiving station, and providing information relating to the received signal to the transmitting station by means of a return channel. Such apparatus comprises, inter alia, at the receiving station, a threshold device for measuring the level of the received signal and providing information relating to the level of the received signal and, at the transmitting station, control means to increase or decrease the transmitting power in in response to such information over a given dynamic control range.

2. Description of the Related Art

Apparatus of this kind for controlling transmitting power is known from U.S. Pat. No. 4 004 224, assigned to the Siemens company.

In this patent control of the transmitting power is a function of a criterion corresponding to the level of the received signal. The fact that this sole criterion is employed has several drawbacks. A first drawback emerges from the fact that no account is taken of the quality of the received digital signal, i.e. of the error rate present in the received digital signal; in fact, the transmitting power is automatically increased in order to maintain a constant received-signal level, even if the value of the transmitted power necessitates operation in a non-linear range. The choice of this criterion is incompatible with the desire for a lower error rate and thus for a high signal quality which is necessary for present-day digital radio systems. A second drawback is that power regulation of this kind takes into account only disturbances inherent in the regulated transmission channel and is inoperative in respect of disturbance due to adjacent channels.

SUMMARY OF THE INVENTION

The present invention provides apparatus of the aforesaid kind which does not have the disadvantages of the known apparatus.

To that end apparatus for controlling the transmitting power of a digital radio link of the kind referred to above additionally comprises, at the receiving station, a threshold device for measuring the error rate of the received signal so as to provide information on the quality of the received signal. In combination with another threshold device for measuring the received-signal level, and by means of both a device for the combined processing of these kinds of information, located at the transmitting station, this makes it possible to employ combined processing of the received-signal level and received-signal error rate measurements to control the transmitting-power control means which adjusts the transmitting power. The combined processing produces an increase or a decrease of the transmitting power over a first part of a dynamic range of adjustment taking into account only the information concerning the received-signal level in relation to a first predetermined threshold. Over a second part of the dynamic range of adjustment, the processing additionally takes into account the information concerning the received-signal quality in relation to a second predetermined threshold.

At the receiving station, a second device determines the quality of the received digital signal by measuring the error rate of such signal, and this quality information is used in combination with the received-signal level information by a combined-processing device in order to control and regulate the power at the transmitting station.

It should be noted that control of transmitting power as a function only of a quality criterion of a received digital radio signal is known from the U.S. Pat. No. 4 309 771. In this patent the power-level control depends only on the criterion linked to the transmission quality, i.e. it depends on the error rate measured in the received digital signals, the errors being measured step-by-step with the aid of, for example, a parity bit. The sole use of a criterion of this kind has disadvantages, the first and most obvious of which is that it is necessary to wait for the occurrence of a certain number of errors exceeding a predetermined threshold in order to start altering the transmitting-power level. However, the aim in these systems has been to attain an extremely high quality level, the number of errors occurring in a day having to be very low. A second drawback involved in the use of solely such a criterion by itself is that when the occurrence of errors is due to the presence of distortion in the transmission channel, blocking effects can occur. In fact, the transmitting-power level is then increased without, nevertheless, eliminating the errors, which has the effect of increasing the transmitted power up to the maximum value, a power range in which numerous non-linearities occur. This increases the number of errors considerably, the device becomes blocked and, when the error rate becomes greater than $10^{-3}$ (the upper limit at present permitted), transmission is then cut off.

The applicant has succeeded in effectively combining these two criteria of received level and signal quality so as to avoid the aforesaid disadvantages while achieving an aim often sought after in the radio-link field, where transmission is generally effected with a greatly excessive margin, the aim being to limit the transmitted power. On the other hand, the combined use of these two criteria makes it possible to improve appreciably the spectral efficiency and thus reduce the channel spacing while employing simple modulation equipment.

For clearer understanding of the invention it is necessary to make some brief reminders relating to the context in which the apparatus according to the said invention operates.

Sixteen-state quadrature amplitude modulation (QAM 16) makes it possible, at the cost of a reasonable complexity, to ensure the transmission of 140 M bits/s in a frequency plan with 40 MHz spacing. The correct transmission of such modulation on digital radio links makes it necessary to use linear amplifiers.

To that end present-day solid-state amplifiers are used for the transmission of signals whose average power is lowered approximately 6 dB in relation to the 1 dB compression point so as to obtain a residual error rate which is considerably lower than $10^{-10}$.

However, experience shows that when the gain of the constant error-rate system is measured for error rates exceeding $10^{-8}$ or $10^{-7}$, it continues to increase when the transmitting power is raised beyond the (generally chosen) 6 dB set-back point.

The apparatus according to the invention makes it possible to control the increase in the transmitting power and thus to improve the gain of the system during periods in which the effects of propagation fading lead to a receiving level which is near the threshold of the receiver. The gains thus obtained may be of the order of 3 dB, enabling the cut-off times which are necessary when the error rate exceeds $10^{-3}$ to be divided by approximately 2.

BRIEF DESCRIPTION OF THE DRAWINGS

The following description, read with reference to the appended drawings, which are given by way of example, will show how the invention can be implemented.

DESCRIPTION OF THE PREFERRED EMBODIMENTS

Figure 1:
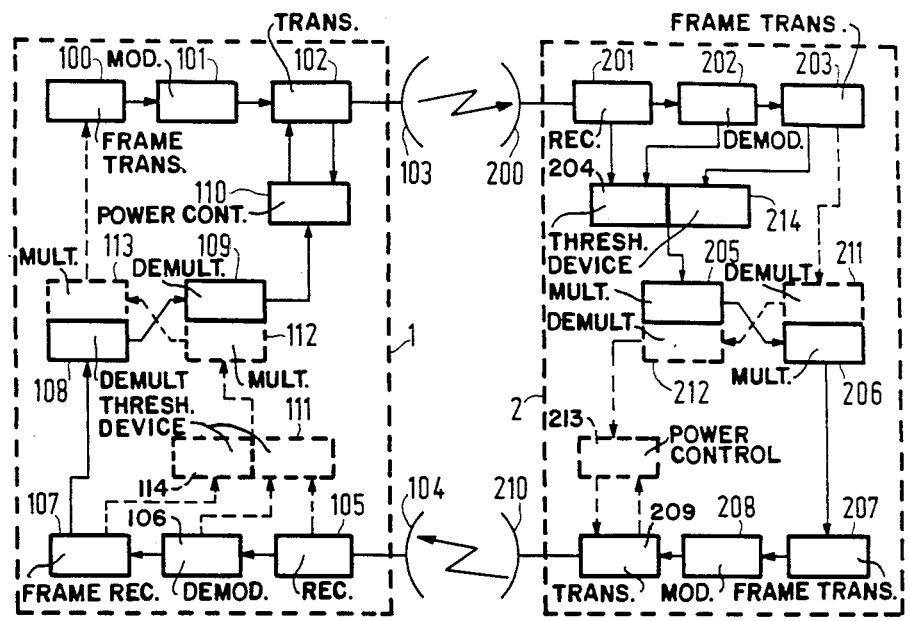
FIG. 1 shows a block diagram illustrating a connection between two stations.

Shown in FIG. 1 is a block diagram illustrating a link between two stations 1 and 2. In the description which follows, although these two stations each have a transmitting section and a receiving section station 1 will, for clearer understanding of the subject, will be called the transmitting station and station 2 the receiving station, the signal considered being transmitted by station 1 and received by station 2. It will be obvious that the description would be absolutely identical for a signal transmitted from station 2 to station 1. The circuits and devices through which the signal passes in the described direction of transmission are shown by continuous lines in the figure whereas, in the other direction of transmission, these circuits and devices, which are in fact identical to the first, are shown by dashed lines.

Transmitting station 1 incorporates, among other things, a frame transmitting device 100 followed by a modulator circuit 101 which in turn is connected to a transmitting circuit 102. Connected to the output of the transmitting circuit 102 is an aerial 103 for the transmission of the signal. At the receiving station 2 the signal is received by means of the aerial 200 connected to the input of the receiving circuit 201 whose output is demodulated by means of demodulator circuit 202, the demodulated signal being then fed towards the frame receiving device 203. The receiving circuit 201 provides received-level measurements to a threshold device 204 for received-signal level measurement (e.g. a comparator circuit or a circuit known as a "Schmitt trigger") which in turn provides logic signals in response to the comparison of the received-signal level with a predetermined threshold. The logic signals are then applied to the input of a multiplexer circuit 205, enabling the preceding information provided by the threshold circuit 204 to be multiplexed into a return channel. Transmission on this return channel is performed with the aid of a service multiplex channel via a service-line multiplexer circuit 206, a frame transmitting device 207, a modulator circuit 208, a transmitting circuit 209 and an aerial 210 which may in fact be simply the aerial 200. The information passing through this return channel is received at the transmitting station by means of an aerial 104, which might be the aerial 103, and a receiving circuit 105, is demodulated by a demodulator circuit 106 and then fed to a receiving frame device 106, which directs the information relating to the return channel to a service-line demultiplexer circuit 108 connected to a demultiplexer circuit 109 which is connected to the transmitting-power control equipment 110. The control equipment 110 is connected to the transmitting circuit 102 and receives from the latter the indication of the transmitted power level. The output from the control equipment 110 is fed to the transmitting circuit 102 to control the transmitting power by increasing or decreasing the transmitted power on the basis of the information processed in the said control equipment.

The process in the direction of transmission from station 2 to station 1 is identical. The transmitting circuit 209 of the station transmits by means of serial 210 the signal coming from the transmitting frame device 207 and from the modulator circuit 208. These signals transmitted via station 2 are received at station 1 via the aerial 204 and the receiving circuit 105 which is connected to a threshold device 111 for measurement of the received signal level in connection with a multiplexer circuit 112 which is itself connected to the service-line multiplexer circuit 113. The received-signal level measurement information present at the output of the multiplexer circuit 113 is fed to the aerial 200 and the receiving circuit 201 via the transmitting frame device 100, the modulator circuit 101 and the transmitting circuit 102 associated with the aerial 103. The signals at the output of receiving circuit 201 are demodulated by the demodulator circuit 202 and pass through the receiving frame device 203 which directs the information to a service-line demultiplexer circuit 211. The latter is connected to a demultiplexer circuit 212 which passes the received-signal level information on to the transmitting-power control equipment 213, which is also connected to the transmitting circuit 209 which thus provides it with the indication of the transmitted-power level. The output from the control equipment 213 is connected to the transmitting circuit 209 in order to control the transmitting power.

According to the invention, the apparatus for controlling the transmitting power of a radio link between at least one transmitting station 1 and one receiving station 2 provides information relating to the received signal to the transmitting station by means of a return channel. The control apparatus comprises, among other things, at the receiving station, a threshold device 204 for measuring the received-signal level, providing information concerning the level of the received signal, and, at the transmitting station control equipment 110 to increase or decrease the transmitting power over a given dynamic control range. The apparatus additionally comprises, at the receiving station, another threshold device 214 for measuring the received-signal error rate, providing information relating to the quality of the received signal, which, in combination with the threshold device 204 for measuring the received-signal level and by means of a device for the combined processing of these items of information, located at transmitting station 1, makes it possible to apply combined processing of the received-signal level measurement and that of the received-signal error rate to the equipment 110 controlling the transmitting power so as to control the said transmitting power. The combined processing produces an increase or a decrease of the transmitting power for a first part of the dynamic control range, taking into account only the information concerning the received-signal level in relation to a first predetermined threshold and, for a second part of the dynamic control range, taking additionally into account the information concerning the quality of the received signal in relation to a second predetermined threshold.

Figure 3:
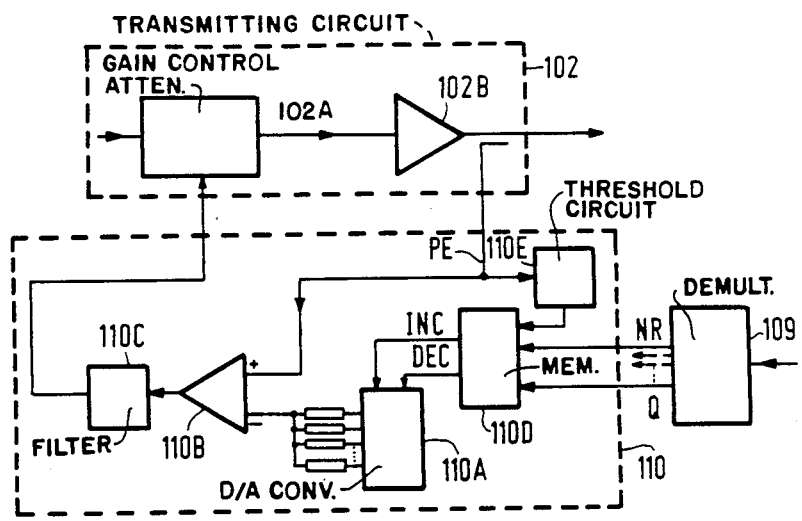
FIG. 3 shows a block diagram of the equipment which controls the transmitting power.
Figure 4:
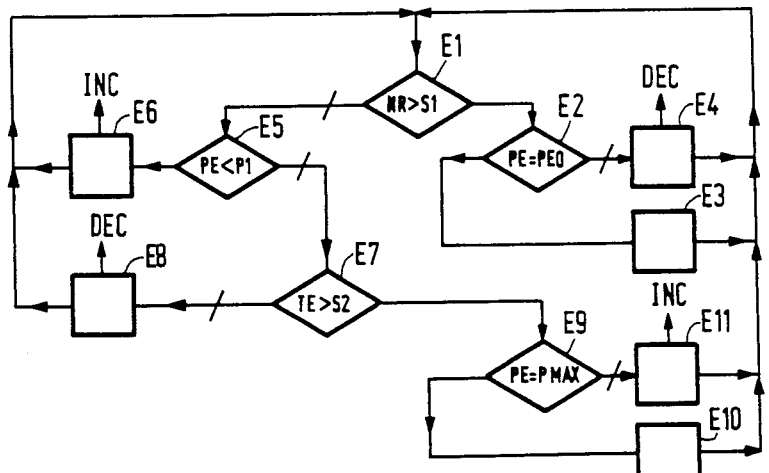
FIG. 4 is a flow diagram of the process used to control variation in transmitting power in accordance with the information received from a receiving station.

The threshold device 214 for measuring the error rate of the received signal (e.g. a comparator circuit or a circuit known as a "Schmitt trigger") is linked to the threshold device 204 for measuring the received level. To the inputs of this device 214 there are applied, on the one hand, derived from the demodulator circuit 202, the information concerning the loss of synchronisation and, on the other, derived from the receiving frame device 203, the information concerning divergence from parity. The output from device 214 which thus provides the information concerning the quality of the received signal is connected to the multiplexer circuit 205 which then performs the multiplexing of the information concerning the received-signal level and that concerning the received-signal quality. The information thus multiplexed is transmitted via the various circuits and devices previously described for the transmisson of the information relating to the level of the received signal and demultiplexed by the demultiplexer circuit 109 connected to the control equipment 110. The device for combined processing of the information is included in the control equipment 110. It is illustrated in FIG. 3, and a combined processing of the information is illustrated in FIG. 4.

Identically, in the direction of transmission from station 2 to station 1, a threshold device 114 for measuring the received-signal error rate is linked to the threshold device 111 for measuring the received signal and likewise a device for the combined processing of the information is incorporated in the control equipment 213.

Figure 2:
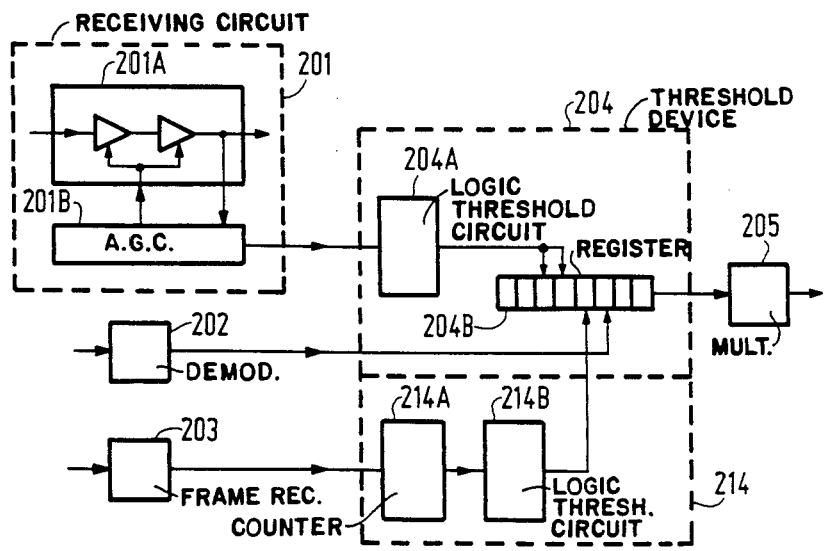
FIG. 2 presents a block diagram of the threshold devices for measuring the received level and the quality of the signal at the receiving station.

FIG. 2 shows a block diagram of the threshold device for measuring the received-signal level and the quality of the signal at receiving station 2, i.e. for the direction of transmission of information from station 1 to station 2. In this diagram the receiving circuit 201 is shown only with an IF (Intermediate Frequency) amplifier 201A and an automatic gain control 201B. The output signal from the amplifier 201A is re-injected into the circuit 201B which thus checks the gain of the amplifier 201A. Circuit 201 B supplies the received-signal level measurement to the threshold device 204 for measuring the received-signal level, which circuit incorporates a logic threshold cirucit 204A and a register 204B. The logic threshold circuit 204A feeds the register 204B binary digital data relating to the overshooting or non-overshooting of the received-signal level in relation to reference thresholds. An analogue/digital convertor may very well replace the threshold circuit 204A. From the demodulator circuit 202 there is transmitted an alarm logic signal when a loss of synchronisation occurs at the receiving station 2, and this logic signal is transmitted to register 204B. When such an alarm signal occurs, the transmitted-power level is maintained, then, after a time Ta (of the order of 10 s), the transmitted power is changed to its minimum level. The receiving frame device 203 feeds an indication of the divergence of the parity bit to the threshold device 214 for measuring the quality of the received signal. According to the invention, device 214 incorporates a counting circuit 214A which makes it possible to evaluate the error rate by counting the number of parity divergences during a certain length of time T. This length of time or measurement window is fixed as long as the number of parity divergences is low, e.g. lower than or equal to $n_1$ parity divergences during T. A measurement window of this kind can be obtained, for example, by counting the frequency of recurrence of the frame, the closing or opening of the window for a new counting period depending on the contents of the counting circuit itself, which is reset to zero for each subsequent window. As soon as the number of divergences increases, this period becomes variable and when the counting circuit has counted $n_1$ divergences the measurement window is closed and a new measurement window is opened for a new count. When the occurrence of $N_1$ windows with a reduced length of time has been observed, a logic threshold circuit 214B is activated and feeds a logic signal to register 204B, the error rate being greater than the predetermined threshold $n_1 \times N_1$. The return to normal or deactivation of circuit 214B takes place if in each of $N_2$ windows with a length T the number of divergences is again lower than or equal to a number $n_2$, the deactivation threshold thus being equal to $n_2 \times N_2$. As a protection against the occurrence of groups of short-lived or spurious errors, it is also possible to enable the counting of parity divergences ony after a delay time t, this delay t not being brought into play upon the return to normal and hence the deactivation of circuit 214B.

According to the invention, the various logic signals representing the received-signal level and received signal quality information are stored in register 204B and passed on serially to the multiplexer 205.

FIG. 3 shows a block diagram of the transmitting-power control equipment which in the direction of transmission described (from station 1 to station 2) belongs to the transmitting station and is marked 110 in FIG. 1.

The control equipment 110 produces a control signal which is applied to a controllable attenuator 102A of the transmitting circuit 102. The controllable attenuator 102A acts on the gain of an amplifier 102B.

Attenuator 102A can control either the IF (Intermediate Frequency) or the RF (Radio Frequency) part of the transmitting circuit 102. To simplify the diagram the attenuator is shown as controlling the RF part, i.e. it acts directly on the amplifier 102B. At the output of amplifier 102B detection of the transmitting power is performed by means of a coupler which passes on the indication of the transmitted-power level to the control equipment 110, which also receives the received-signal level and received-signal quality information at the receiving station via the demultiplexer circuit 109. The control equipment consists essentially of a digital-/analogue converter 110A which applies a control signal to an amplifier 110B which also receives as a reference the transmitting-power indication derived from the transmitting circuit 102. Amplifier 110B is followed by a pass-band filter 110C, the signal at the output of the pass-band filter being the signal controlling the attenuator 102A. The digital/analogue converter 110A may take the form of a counter/down-counter which makes it possible to perform incrementation or decrementation steps. These steps as determined by weighting resistors in the convertor circuit, which may be constant or variable.

According to the invention, a device for the combined processing of the information is incorporated in the control equipment. In fact, to control the convertor circuit 110A on the basis of the various types of information derived from the receiving station, a device 110D for the combined processing of this information is included in the control equipment. Device 110D will preferably be a programmable memory circuit (e.g. a PROM) in the memory of which the combined processing which is described by means of FIG. 4 has been programmed; it may, however, be constructed in a discrete form from traditional logic circuits.

To one of the inputs of device 110D is applied a logic signal, depending on the transmitting-power level, produced by a threshold circuit 110E which compares the transmitting-power indication PE derived from the transmitting circuit 102 with typical values such as, for example, a minimum transmitting-power value PEO, with an upper dynamic threshold P1 of the received signal corresponding to the upper threshold of the first part of the dynamic control range in order to ascertain only the received-signal level information, and with a maximum power value PMAX pertaining to the upper threshold of the second part of the dynamic control range in order to ascertain additionally the received-signal quality information.

The other inputs of device 110D are connected to the demultiplexer circuit 109 which supplies the information concerning the received-signal level NR and the quality Q of the signal. After processing the received information, device 110D controls the convertor 110A by means of two signals, a signal INC to apply an incrementation and hence an increase in the transmitting power, and a signal DEC to apply a decrementation and hence a reduction of the transmitting power.

FIG. 4 illustrates a processing system employed at the transmitting station in the device for the combined processing of the information required to operate the increase or decrease of the transmitting power using the information derived from the receiving station.

The diagram shows the various successive states in the progress of the combined processing of the information which, according to the invention, consists in producing an increase or a decrease of the transmitting power PE over dynamic control range. For a first part of the dynamic control range the combined processing takes into account only the received-signal level information NR pertaining to a first predetermined threshhold S1. For a second part of the dynamic control range the combined processing additionally takes into account the received-signal quality information Q pertaining to a second predetermined threshold S2.

Thus, at state E1, a first question is asked. Is the level of the received signal NR higher than the first predetermined level S1; if the answer is "yes", the apparatus is in a reduction phase and a second question is asked at state E2. Is the transmitting power PE equal to the minimum permitted transmitting power PEO? If the answer is "yes", the transmitting power cannot be reduced further; this level is maintained at E3 and the system keeps reverting to state E1 until a new reply is received to the first or the second question. If, on the other hand, the reply is "no", it is possible to reduce the transmitting power further and a decrementation order DEC for one step is given; the next state is E4, from which there is a return to stage E1 in order, if necessary, to continue reducing the transmitting power in steps. In the event that, in state E1, the reply to the first question (is the received-signal level NR below the first predetermined first threshold S1?) is "no", a third question is asked at state E5: is the transmitting power level PE lower than an upper dynamic threshold P1 of the received level? Threshold P1 is the threshold not to be crossed in the first part of the dynamic control range when only the received-signal level information is taken into consideration. If the reply is "yes", it is possible to increase the transmitting power and an incrementation order INC for one step is given. The next state now is E6 and there is a return to state E1 in order, if necessary, to continue increasing the transmitting power in steps. If, on the other hand, at state E5, the reply to the third question is "no", a fourth question is asked at state E7: is the error rate TE in the received signal, expressing the quality of the received signal Q, higher than the second predetermined threshold S2? If the reply in "no", a decrementation order DEC for one step is given; the next state is E8, from which there is a return to state E1 for other possible reductions of the transmitting power in steps. If, on the other hand, the reply is "yes", a last question is asked at state E9: is the transmitting power PE equal to the maximum permitted power PMAX at the output of the transmitting circuit? In the case of a reply in the affirmative, the transmitting power cannot be increased further and it is therefore maintained. This is now state E10 and there is a return to state E1. If, however, the reply is negative, an incrementation order INC for one step to E11 is given, which is followed by a return to state E1 in order, if necessary, to increase the transmitting power again in steps. As soon as the received level NR becomes higher than the threshold S1, a decrementation phase to state E4 is triggered to avoid cut-off effects.

Thus, in normal propagation conditions, the transmitting-power level is kept low (amply lower than the 1 dB compression point) so that the non-linearities of the amplifier are negligible and lead to a residual error level which is considerably lower than $10^{-10}$.

In the event of fading on the propagation path, when the received-signal level NR drops below the predetermined threshold S1, the transmitting-power control equipment increases the transmitting power in step-by-step fashion in such a way as to maintain the received-signal level at the nominal value determined by the threshold. However, the transmitting-power value will be limited to the value P1 located 6 dB below the 1 dB compression point as long as the receiving station has not detected the presence of an error rate exceeding the fixed threshold S2. The detection of the presence of an error rate exceeding the fixed threshold then authorises the transmitting power level to increase up to the level PMAX, approximately 3 dB below the 1 dB compression point (beyond which the zone of marked non-linearities would be reached), which has the effect of reducing the cut-out time due to fading of the propagation. One of the advantages of the device is thus achieved: it enables the really usable power of a solid-state amplifier used to transmit a type MAQ 16 modulation to be increased by about 3 dB when considerable propagation fading occurs, but a low transmission-power level to be maintained under normal propagation conditions.

On the other hand, outputs of 140 Mbits/s using MAQ 16 modulation are transmitted nowadays on radio links within 40 MHz frequency plans, i.e. whose spacing between two adjacent channels is 40 MHz. Two adjacent channels are transmitted with crossed (orthogonal) polarization and have a polarization decoupling of the order of 30 dB in periods of normal propagation. In periods of propagation fading and when the depth of fading exceeds 15 dB, there is a loss of polarisation decoupling in accordance with a relation of the type:

$$XPD = 45 - A$$

in which XPD represents the polarization decoupling and A the depth of fading.

To ensure that the disturbance caused by this loss of decoupling does not greatly reduce the margin of the link, supplementary protection by filtering is necessary. For channels with 40 MHz spacing using Nyquist filtering with a rounded-off factor of 0.5 the protection obtained is of the order of 17 to 18 dB and thus makes it possible to achieve radio links giving a gross margin of 40 dB which is not much degraded by the presence of an adjacent channel.

The use of 30 MHz frequency plans with MAQ16 modulation under the same conditions reduces this protection by filtering to about 8 dB, which entails a considerable loss of gross margin on links having a high initial gross margin.

Use of apparatus according to the invention makes it possible to employ 30 MHz frequency plans with MAQ16 modulation (16 states), while avoiding having to use more complex types of modulation (e.g. 64 states).

To that end, it should be noted that in a period of fading adjacent channels operating with crossed polarisations show very considerable correlation for fading which does not exceed 10 to 15 dB and show practially total decorrelation for deeper fading.

The apparent loss of polarisation decoupling is thus due mostly to the difference in received-signal level between the two channels at the receiving aerial.

Thus, for a link showing a gross margin of 40 dB for an isolated channel, it is possible to position the transmitting-power level 15 dB below the nominal power level leading to the gross margin of 40 dB and to position the received-signal level threshold leading to the start of transmission-power level adjustment to 10 dB above the nominal threshold. Consequently, when fading does not exceed 15 dB, a phase during which they are highly correlated, there is no variation in the transmitting power, and the levels of the received signals are practially identical on both polarisations. When fading on one channel exceeds a depth of 15 dB, there is then a start of adjustment (increase of the transmitting power) on that channel and there is practically no variation in the transmitting power on the adjacent channel, the interference on which is thus reduced by approximately 15 dB.

Another advantage of apparatus according to the invention is thus that it permits the use of 30 MHz frequency plans while retaining simple QAM 16 modulation equipment.

Although only two stations have been referred to for clarity and simplicity of the description, it will be obvious that the description can be generalised to n stations, each station possessing a transmitting section and a receiving section.

Finally, the use of the apparatus for controlling transmitting power according to the invention is in no way limited to applications involving 16-state modulation equipment.

What is claimed is:

1. Apparatus for controlling the transmission power of a transmitting station which transmits digital signals to a receiving station over a radio communication channel, the receiving station also transmitting digital signals to the transmitting station over a return radio communication channel; such apparatus comprising:
   (a) in the receiving station
      a first threshold device adapted to measure the level of a received signal relative to a predetermined minimum threshold value, and to produce an information signal corresponding to such measured level of the received signal;
      a second threshold device adapted to measure the quality of a received signal by comparing the error rate thereof with a predetermined maximum threshold value, and to produce an information signal corresponding to such measured quality of the received signal;
      means for transmitting said level information signal and said quality information signal over said return channel to the transmitting station;
   (b) in the transmitting station
      means for receiving the level information and quality information signals from the receiving station;
      transmission power control means for increasing or decreasing the transmission power of the transmitting station over a dynamic adjustment range;
      information processing means connected to said receiving means and adapted to produce a control signal derived from a combination of the level information signal and the quality information signal, and to apply such control signal to said transmission power control means;
      such control signal causing said transmission power control means to effect an increase or decrease of the transmission power of the transmitting station over a first part of said dynamic adjustment range solely in accordance with said level information signal, and to effect an increase or decrease of the transmisson power of the transmitting station over a second part of said dynamic adjustment range in accordance with a combination of said level information signal and signal quality information signal.

2. Apparatus in accordance with claim 1, wherein over said second part of said dynamic adjustment range the control signal produced by said information processing means effects an increase of the transmitter power up to a predetermined maximum value only when the level information signal signifies a received signal level below said minimum threshold value thereof and the quality information signal simultaneously signifies a received signal error rate exceeding said maximum threshold value thereof.

3. Apparatus as claimed in claim 1, wherein said information processing means in the transmitting station is incorporated in said transmission power control means.

4. Apparatus as claimed in claim 1, wherein said second threshold device for measuring the quality of the received signal comprises a counting circuit for counting parity divergences in such signal.

5. Apparatus as claimed in claim 1, wherein the receiving station further comprises a register connected to the first and second threshold devices for storing said level information signal and signal quality information signal therein and serially feeding out such stored signals to said means for transmitting such signals to the transmitting station.

* * * * *